H. F. NEHR.
EGG BEATER.
APPLICATION FILED MAR. 18, 1909.
951,834.
Patented Mar. 15, 1910.
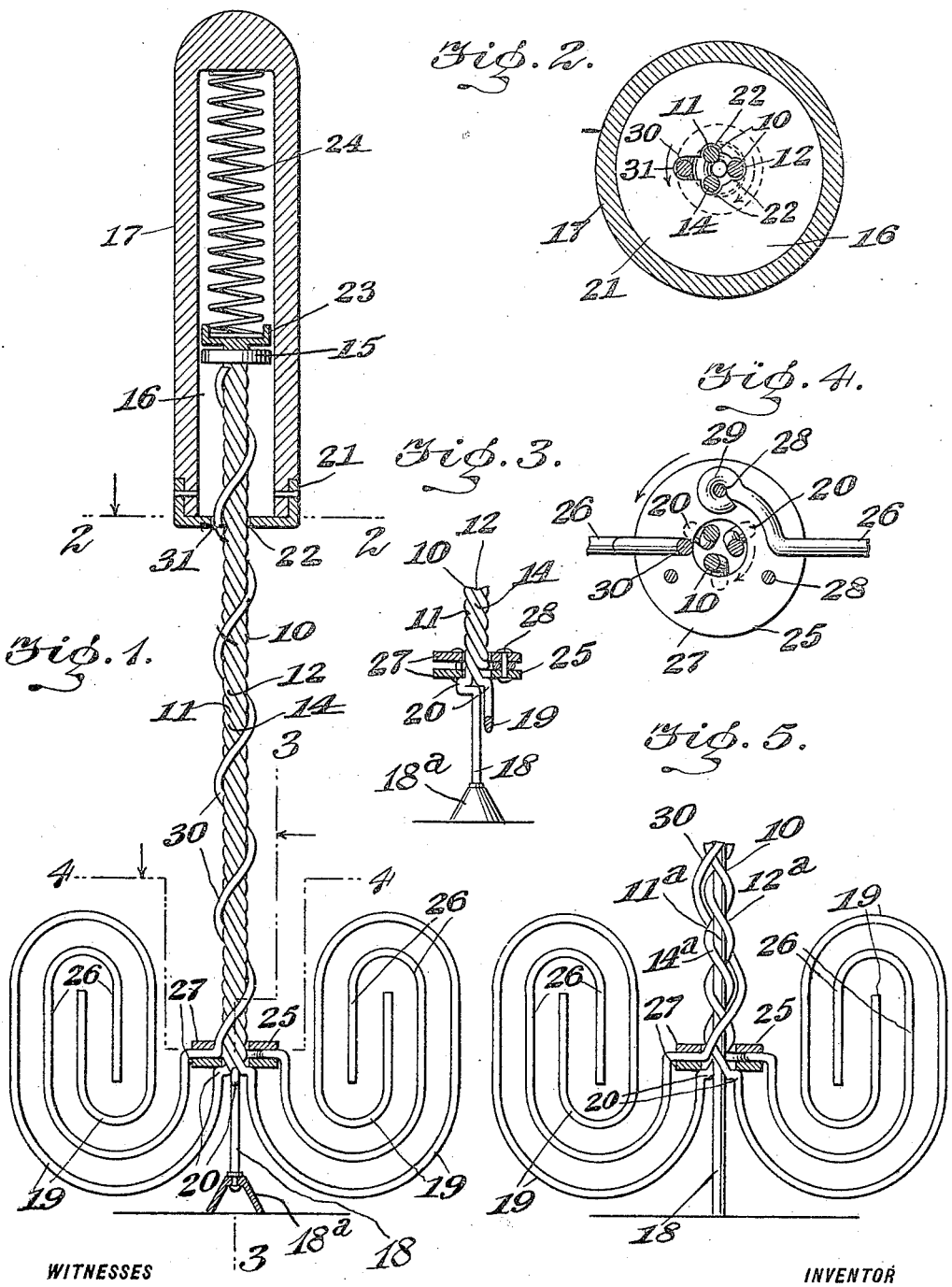
WITNESSES
INVENTOR
Herman F. Nehr
BY
ATTORNEY

UNITED STATES PATENT OFFICE.

HERMAN F. NEHR, OF RUTHERFORD, NEW JERSEY.

EGG-BEATER.

951,834.  Specification of Letters Patent.  Patented Mar. 15, 1910.

Application filed March 18, 1909. Serial No. 484,305.

*To all whom it may concern:*

Be it known that I, HERMAN F. NEHR, a citizen of the United States, and a resident of Rutherford, in the county of Bergen and State of New Jersey, have invented certain Improvements in Egg-Beaters, of which the following is a specification.

This invention relates to certain improvements in egg beaters, and more particularly in that class of such devices wherein the beater members are actuated from a reciprocatory screw-threaded stem or equivalent means, and the object of the invention is to provide a device of this general character of a simple and comparatively inexpensive nature, and of a strong and compact construction, having a novel and improved formation of reciprocatory actuating means capable of being conveniently manufactured and adapted for convenient operation for reversely driving the beater members at such high and uniform speed as will materially facilitate the use of the device.

The invention consists in certain novel features of the construction, and combinations and arrangements of the several parts of the improved egg beater, whereby certain important advantages are attained, and the device is rendered simpler, less expensive, and otherwise better adapted and more convenient for use, all as will be hereinafter fully set forth.

The novel features of the invention will be carefully defined in the claims.

In order that my invention may be the better understood I will now proceed to describe the same with reference to the accompanying drawings, wherein—

Figure 1 is a side elevation showing an egg beater embodying my improvements, the handle member thereof being shown in axial section to illustrate the contained spring actuating means; Fig. 2 is a sectional view drawn upon an enlarged scale, and taken through the base of the handle member in the plane indicated by the line 2—2 in Fig. 1; Fig. 3 is a sectional detail view taken through the lower part of the device in the broken plane indicated by the line 3—3 in Fig. 1, the stem of the device being, however, shown in elevation; Fig. 4 is an enlarged sectional detail view taken transversely through the lower part of the device in the plane indicated by the line 4—4 in Fig. 1, and Fig. 5 is a sectional side elevation, somewhat similar to the lower portion of Fig. 1, and showing a modified formation of the device.

As shown in these views, the improved egg beater comprises an elongated stem or actuating member 10 which, as illustrated in Fig. 1 is formed from three wires of proper gage, twisted spirally together in such a manner as to produce a triple screw-threaded surface extended lengthwise along said stem or member, and represented by the numerals 11, 12 and 14 upon Fig. 1, the upper end of said stem or member 10 being provided with a head or enlargement 15 of a diameter adapted to play vertically in an axial bore or chamber 16 produced in the lower part of a handle member 17, which may be conveniently made of wood or other suitable material, and is herein shown provided with a rounded and imperforate upper end adapted to be rested against the palm of the hand when the handle member is grasped by the operator, so that downward pressure may be conveniently applied for operating the device in a well known way.

At the lower part of the actuating stem or member 10, two of the wires from which the same is formed are bent or deflected laterally, in spiral formation, as shown at 19, 19 in Fig. 1, so as to produce beaters integrally connected with said stem at diametrically opposite points, and adapted to dip within the liquid to be beaten so as to stir or whip the same in a well known way during use of the device, while the third of the three wires from which said stem or member 10 is formed is extended as shown at 18 in Figs. 1 and 3, directly downward in alinement with the axis of said stem, and its lower end portion has a swivel connection with the upper central part or apex of a conical base or foot member 18ª, the lower edge portion of which is adapted to project below the beaters 19, 19 and to securely rest, as shown in Figs. 1 and 3, upon the bottom of the vessel wherein the liquid to be beaten or stirred is contained, and thereby afford an effective support for the device and prevent lateral slipping or sliding of the same across the bottom of such vessel during practical use.

At the points where the several wires of the stem or actuating member diverge from one another to produce the laterally directed beaters 19, 19 and the stem extension 18, said wires are produced with shoulders 20, 20, extended outwardly from said stem 10 at different points in its circumference, and upon said shoulders is supported for turning movement a head or connecting member 25, from which are extended diametrically opposite wires or strips which are bent to provide spiral beaters 26, 26, of such conformation as to be adapted to play, during the use of the device, between the volute turns of the first-mentioned beaters 19, 19, as clearly represented in Fig. 1. As herein shown the head or connecting member 25 is formed from two perforated disks 27, 27 of flat metal, between which the inner parts of the wires or strips from which the auxiliary beaters 26, 26 are securely clamped and held, and these disks are held in relation by means of rivets 28 or the like passed through them, one of said rivets affording means for the attachment of one of the clamped wires or strips as shown at 29.

From the head or connecting member 25, an auxiliary actuating member 30 is extended upwardly parallel with the stem or member 10, and as herein shown, this auxiliary actuating member 30 is integrally produced upon the inner end of one of the wires or strips from which the auxiliary beaters 19, are formed, being a continuation of such wire or strip extended upwardly from the head or member 25 closely adjacent to the circumference of the stem 10, and being coiled or bent spirally around said stem, but capable of turning freely about the same, and having its spiral turns extended at a pitch or inclination different from that of the spiral surfaces of the wires of the stem being, as herein shown, reversely inclined to the spiral turns of the wires 11, 12 and 14 from which the stem 10 is formed. The upper extremity of this auxiliary actuating member 30 terminates adjacent to the head 15 at the upper end of the stem 10, but is not connected therewith.

The open lower end of the handle member 17 is provided with an attached ferrule or closure 21, secured in position in any preferred manner, and extended across the open lower end of the bore or chamber 16 of said handle member, and this ferrule is centrally perforated for the passage of the stem or actuating member 10, its perforation being provided with notched edge portions, 22, 22 so positioned as to be adapted to conform with and receive the spiral screw-threads produced by the twisted wires or strips 11, 12 and 14, whereby when the handle member is grasped by the operator, and pushed downward, the stem extension 18 being rested upon the bottom of the vessel, a rapid rotatory movement will be imparted to said stem 10 so as to drive the beaters 19, 19 attached at its lower end, rapidly in one direction to beat or stir the material in said vessel. During such downward movement of the handle member 17, the headed end 15 of the stem 10 is driven up within the bore or chamber 16, and a spiral spring 24, contained in the upper part of said bore or chamber with its lower end engaged upon a washer 23 rested upon said head 15, and its upper end engaged upon the imperforate upper end of the handle member 17, is placed under tension, so that when the downward pressure exerted upon said handle member by the operator is relaxed, the tension of said spring 24 will be exerted to elevate the handle member and by the continued engagement of the notched edge portions 22, 22 of the ferrule 21, at the perforation therein, with the spiral turns or screw-threads of the twisted wires 11, 12 and 14, to impart rapid rotatory movement to the stem or member 10 during such elevation of the handle member in a direction the reverse to that in which the stem is turned during the downward thrust of said handle member, whereby it will be seen that in the use of the device by rapidly reciprocating the handle member along the stem 10, rapid rotatory impulses, first in one direction and then in the other, will be imparted to the beaters 19.

At one side of the central perforation in the ferrule 21 through which the stem 10 plays as above described, is produced an auxiliary notch or aperture 31, wherein the spiral auxiliary actuating member 30 has engagement in a manner similar to that in which the members or wires 11, 12 and 14 are engaged with the notches 22, 22 as above described, and by this construction and arrangement of the parts it will be seen that as the handle member 17 is reciprocated in the use of the device to reversely actuate the beaters 19, 19 first in one direction and then in the other, the auxiliary actuating member 30 and the auxiliary beaters 26, 26 carried by the head 25 at the lower end thereof will be rapidly turned first in one direction and then in the other, in unison with the reciprocatory movements of the handle, and since the spiral turns of the said auxiliary member 30 are extended in a direction reverse to those of the stem or member 10, it will be evident that the beaters 26 will be turned reversely to the beaters 19 during use of the device, and by playing through the material to be stirred or beaten in close relation to the reversely moving beaters 19, will operate to more effectively stir and whip the material, so as to materially quicken the beating operation.

In the structure illustrated in Fig. 5, the stem or member 10 is of somewhat different construction from that described above, being formed from three members 11$^a$, 12$^a$ and 14$^a$, of which the member 11$^a$ is shown as made straight from end to end, whereas the members 12$^a$ and 14$^a$ are twisted spirally about said straight central member 11$^a$ so as to produce screw threads upon the peripheral surface thereof. By this formation of the stem, the screw threads thereof are spaced apart, and a shorter length of wire is needful, and the wire 11$^a$ may be of greater gage so as to strengthen the stem and stiffen the stem extension at its lower end.

From the above description of my invention it will be seen that the device provided with my improvements is of an extremely simple and comparatively inexpensive nature and of a strong and compact construction, so as to be well adapted for use, and the means for reversely driving the beaters permits of increased convenience and a material saving of time during use and it will also be obvious from the above description that the device is susceptible of considerable modification without material departure from the principles and spirit of the invention and for this reason I do not desire to be understood as limiting myself to the precise formation and arrangement of the several parts of the device as herein set forth in carrying out my invention in practice.

Having thus described my invention, what I claim and desire to secure by Letters Patent is—

1. A device of the character described having a plurality of actuating members one of which is extended around the other, said members being provided with spiral surfaces and having beaters capable of independent movement, and a reciprocatory handle member having a bore wherein the upper end of each actuating member is received during reciprocatory movement of said handle member, and provided with means for independent engagement with the spiral surfaces of the respective actuating members to independently turn the same.

2. A device of the character described having a plurality of actuating members one of which is extended around the other, said members being provided with reverse spiral surfaces and having beaters capable of independent movement, a reciprocatory handle member having means for engagement with the reverse spiral surfaces of said actuating members for independently turning said actuating members when the handle member is reciprocated, and resilient means for moving said handle member in one direction relatively to said actuating members.

3. A device of the character described having a stem provided with a spiral surface, a beater connected therewith, a reciprocatory handle member having a bore wherein said stem is received during reciprocatory movement of the handle member, and having means for engagement with the spiral surface of the stem to drive the same, an auxiliary actuating member extended around the stem and having a spiral surface different from that of the stem, a beater connected therewith, and means engageable with the spiral surface of the auxiliary actuating member to turn the same independently of said stem.

4. A device of the character described having a stem provided with a spiral surface, a beater connected therewith, a reciprocatory handle member having a bore wherein said stem is received during reciprocatory movement of the handle member, an auxiliary actuating member extended around the stem and provided with a spiral surface reverse to that of said stem, a beater connected with said auxiliary actuating member, and means carried by the handle member and engageable with the reverse spiral surfaces of said stem and auxiliary actuating member to reversely turn the same during reciprocatory movement of the handle member.

5. A device of the character described having a stem provided with a spiral surface, a beater connected therewith, a reciprocatory handle member having a bore wherein said stem is received during reciprocatory movement of the handle member in one direction, resilient means within the bore of the handle member and capable of being tensioned during movement of said member in a direction to house the stem therein, an auxiliary actuating member extended around the stem and provided with a spiral surface reverse to that of said stem, a beater connected with said auxiliary actuating member, and means carried by the handle member and engageable with the reverse spiral surfaces of the stem and auxiliary actuating member to reversely turn the same during reciprocatory movement of the handle member.

6. A device of the character described having a stem provided with a spiral surface, a beater connected therewith, a reciprocatory handle member having a bore wherein said stem is received during reciprocatory movement of the handle member, in one direction, resilient means within the bore of the handle member and capable of being tensioned during movement of said member in a direction to house the stem therein, an auxiliary actuating member extended around the stem and provided with a spiral surface reverse to that of the stem, a beater connected with the auxiliary actuating member, and a ferrule carried by the handle member and apertured for the passage of the stem and provided with edge portions engageable with the reverse spiral surfaces of the stem, an actuating member to compel reverse turning movement of the same during reciprocatory movement of the handle member.

7. A device of the character described having a stem the lower end of which has a beater, an auxiliary actuating member extended around the stem and also provided with a beater at its lower end, the upper ends of said stem and auxiliary actuating member having spiral surfaces extended at different inclinations, and means engaged with the differently inclined spiral surfaces of said stem and auxiliary actuating member, and capable of operation to turn said stem and auxiliary actuating member independently of one another.

8. A device of the character described having a stem, the lower end of which has a beater, an auxiliary actuating member the lower end of which is also provided with a beater, the upper ends of said stem and auxiliary actuating member having spiral surfaces extended at different inclinations, and the upper part of the auxiliary member being extended around the upper part of the stem, and a reciprocatory handle member having a bore wherein the upper ends of said stem and auxiliary actuating member are received, and having means engaged with the differently inclined spiral surfaces of said stem and auxiliary actuating member and capable of operation, when the handle is moved, to turn said stem and auxiliary actuating member independently of one another.

In witness whereof I have hereunto signed my name this 10th day of March 1909, in the presence of two subscribing witnesses.

HERMAN F. NEHR.

Witnesses:
FREDK. KAUFMANN,
ANNA KAUFMANN.